United States Patent Office 2,953,585
Patented Sept. 20, 1960

2,953,585

SALTS OF REACTION PRODUCTS OF EPOXIDIZED ACYL RADICAL CONTAINING COMPOUNDS AND POLYAMINO COMPOUNDS

Melvin De Groote and Jen-Pu Cheng, University City, Mo., assignors to Petrolite Corporation, Wilmington, Del., a corporation of Delaware No Drawing. Filed Apr. 13, 1956, Ser. No. 577,955

7 Claims. (Cl. 260—404.5)

The present invention is concerned with the salt form of the reaction products of certain acyl radical containing epoxidized compounds, and most conveniently epoxidized glycerides and epoxidized monohydric alcohol esters, and polynitrogenous compounds, i.e., compounds having 2 or more nitrogen atoms and preferably basic amino compounds, in which there is at least one and in many instances 2 or more basic nitrogen atoms. The salt form may include partial salts, i.e., compounds in which there is an ester or an acid radical or both, but in any event at least one cation.

The products herein described may be employed for a large variety of purposes and include not only the complete salts but acid salts and ester salts as well. Furthermore, these salts can be used as intermediates for conversion into other products.

The products also may be used as intermediates for further reaction.

The initial presentation of the present invention is best adapted to a consideration of such instances where an ester of a monohydric alcohol is involved rather than the ester of a diol, or triol such as a glyceride. If an epoxidized fatty acid ester derived from a low molal alcohol, such as a methyl, ethyl, propyl or butyl ester, is subjected to reaction with a polyamine the resultant product may be indicated thus:

$$CH_3-R_1-\begin{bmatrix}HC-OH\\HC-R\end{bmatrix}-R_2COOR''$$

in which the fatty acid acyl radical prior to expoxidation is the acyl radical of the fatty acid $$CH_3-R_1-\overset{H}{\underset{H}{C}}=\overset{}{\underset{}{C}}-R_2COOH$$

in which $R_1$ and $R_2$ are the conventional hydrocarbon radicals of unsaturated fatty acids having not over 22 carbon atoms; and in which R is the monovalent radical of a polyamine having at least one basic nitrogen atom, said radical being formed by the removal of a hydrogen atom from the polyamine during linkage with the carbon atom, and R'' is a radical derived from a low molal alcohol as previously described.

If, on the other hand, 2 moles of the epoxidized ester are combined with 1 mole of a polyamine, such as triethylene tetramine, then the product derived is as follows:

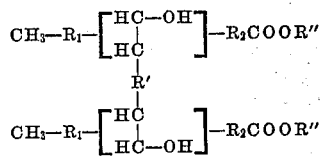

in which the various characters have their prior significance except of course R' has replaced R and is a divalent radical derived from the precursory polyamine.

If products of the kind described above are saponified with caustic soda or caustic potash, one then obtains products such as the following:

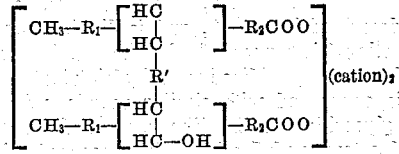

in which the cation would be sodium or potassium.

If, on the other hand, one obtained the free acid, at least in the instance of the second formula, one could obtain an acid salt. To obtain the ester salt one would react 2 moles of the epoxidized monohydric alcohol ester with one mole of polyamine and then add enough of the caustic soda or caustic potash to saponify one ester radical only.

After the sodium salt or potassium salt has been obtained, the product can be subjected to double decomposition with a soluble salt of barium, calcium, magnesium strontium, aluminum, iron, copper or the like, and the metallic salt so obtained subjected to dehydration, to yield the anhydrous salt. The invention is thus directed to a member selected from the class of salts and acid salts of the structure

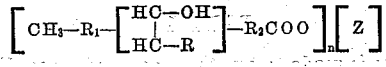

and

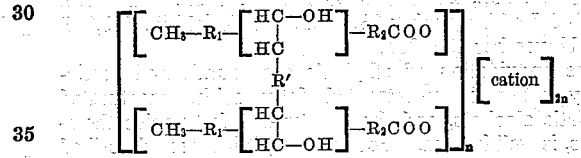

said salts and acid salts being derived from saponifiable polyamine reacted acyl radical containing epoxidized compounds wherein the fatty acid acyl radical prior to epoxidation is $$CH_3-R_1-\overset{H}{\underset{H}{C}}=\overset{}{\underset{}{C}}-R_2CO-$$

in which $R_1$ and $R_2$ are the conventional hydrocarbon radicals of unsaturated fatty acids composed only of carbon, hydrogen and oxygen atoms having not over 22 carbon atoms and each containing at least 3 carbon atoms; in which R is the radical of a polyamine composed only of carbon, hydrogen, nitrogen and oxygen atoms, having up to 20 carbon atoms, and having at least one basic nitrogen atom, said radical being formed by the removal of a hydrogen atom from an amino nitrogen atom of the polyamine during rupture of the oxirane ring and linkage of the amino nitrogen atom with a carbon atom of the oxirane ring, and R' is the radical of a polyamine composed only of carbon, hydrogen, nitrogen and oxygen atoms, having not over 20 carbon atoms and having at least one basic nitrogen atom, said radical being formed by the removal of one hydrogen atom from each of two separate amino nitrogen atoms of the polyamine during rupture of the oxirane rings and linkage of the amino nitrogen atoms with the carbon atoms of the oxirane rings; and $n$ is a whole number not over 3 and in which Z is selected from the group consisting of group Ia, Ib, IIa, IIb and IIIa metal ions, and the cation is selected from the group consisting of Z, hydrogen, and lower alkanol radicals and must include at least one equivalent of Z per anion.

For purpose of convenience what is said hereinafter will be divided into six parts:

Part 1 is concerned with derivatives obtained by the epoxidation of fatty acids or fatty acid compounds or fatty acid salts which are particularly suitable for reaction with a polyamine;

Part 2 is concerned with polyamino compounds particularly suitable for reaction with the epoxidized compounds described in Part 1;

Part 3 is concerned with the reaction involving the two classes of reactants above, i.e., those described in Part 1 and those described in Part 2, and is divided into three sections. Section 1 is concerned with the reaction between the polyamines and epoxidized monohydric alcohol esters, Section 2 is concerned with similar reactions in which epoxidized glycerides or the like replace the monohydric alcohol esters, and Section 3 is concerned with the reactions in which the epoxidized fatty acid salt is employed;

Part 4 is concerned with the saponification of the ester type of reaction product of Part 3 so as to convert the amino radical containing reactant into a free acid or partial ester which, in turn, can be converted by neutralization or saponification into the salt of an alkali metal such as sodium or potassium. It is to be noted that these salts, including partial salts, along with the products obtained in the manner described in Section 3 of Part 3, preceding, typify the products of the present invention;

Part 5 is concerned with the preparation of the barium, aluminum or calcium salts, particularly by use of a solution of the sodium or potassium salts; and Part 6 is concerned with various uses for the products described in Part 5, preceding.

PART 1

Reference is made to our three co-pending applications, Serial No. 532,121 filed September 1, 1955, Serial No. 548,748 filed November 23, 1955, and Serial No. 548,749 filed November 23, 1955.

The epoxidation of ethylenic compounds and particularly esters of unsaturated fatty acids, unsaturated aliphatic alcohols, and the unsaturated fatty acids themselves, is well known. For instance, it has been described in the following patents:

*U.S. Patents Nos.*

| 2,443,280 | 2,556,145 |
|---|---|
| 2,445,892 | 2,567,237 |
| 2,457,328 | 2,567,930 |
| 2,458,484 | 2,569,502 |
| 2,485,160 | 2,661,367 |
| 2,487,829 | 2,686,805 |
| 2,510,905 | 2,692,271 |

Additionally epoxidation procedures have been described in the trade literature of organizations which supply one or more reactants employed in the procedure. For instance, see Bulletin P63–355 entitled "Hydrogen Peroxide—Resin Technique for the Preparation of Peracetic Acid," E. I. du Pont de Nemours & Company; Bulletin P61–454 entitled "Hydrogen Peroxide—Resin Technique for Epoxidation of Unsaturated Fats, Oils, and Derivatives," E. I. du Pont de Nemours & Company; and booklet entitled "Hydrogen Peroxide" issued by Buffalo Electro-Chemical Company, Inc. See also Chemical Week, August 21, 1945, page 100; and Chemical Week, December 25, 1954, page 32.

Fatty acids and fatty acid derivatives which may be subjected to epoxidation by conventional procedures are illustrated by the following:

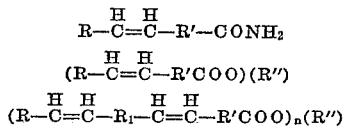

In the above formulas R and R' represent monovalent and divalent hydrocarbon radicals having at least 3 carbon atoms. $R_1$ is a divalent radical.

Stated another way, it is preferable that the ethylene linkage which is subjected to epoxidation is at least 2 carbon atoms removed from the terminal carbon atom or the carboxyl carbon atom.

In the last two formulas R'' represents the ester radical which may be monohydric, dihydric, trihydric, tetrahydric, etc.

In the last formula $n$ is a small whole number varying from 2 to 6 for example, which corresponds to the valency of the multivalent radical R''.

Needless to say if one prepares esters of dihydric alcohols such as ethyleneglycol, propyleneglycol, and diethyleneglycol, one can produce molecules having 1.75 to 4 oxirane rings per ester molecule. Similarly, trihydric esters can be obtained from trihydric alcohols, such as trimethylol ethane, trimethylol propane, etc. The number of oxirane rings would correspond to those of an ordinary glyceride. If one prepared an ester from a tetrahydric alcohol such as diglycerol, pentaerythritol, oxyethylated pentaerythritol, etc., the number of oxirane rings could vary from 3.3 to 8. In the case of a complete ester of a hexitol, such as sorbitol or oxyethylated sorbitol, the number of oxirane rings could vary from 5 to 12. However, for practical purposes the most economical derivatives in many instances are those described in aforementioned U.S. Patent No. 2,556,145.

If one employs an epoxidized glyceride as, for example, epoxidized soybean oil, there is a possibility that the number of epoxide groups are less than one per acyl radical. In other words the value may vary from 2.1 to 2.7 oxirane rings per glyceride radical which may mean there is present at least in part of the glyceride a non-epoxidized acyl radical. If such a product is then reacted with a polyamine and then converted into a salt, such as the sodium or potassium salt, obviously the percentage of active material is less than if one were certain to have at least one oxirane ring in each acyl radical.

From a practical standpoint it would appear simpler to use an epoxidized fatty acid prepared in the manner previously described. In many ways it is difficult to prepare an epoxidized fatty acid on a large scale and the product is not particularly stable. One can obtain, however, sodium epoxystearate or potassium epoxystearate and such products are particularly suitable as reaction products and have the added advantage that neutralization with caustic soda is not required. However, in many instances the most desirable material for epoxidation is the fatty acid ester of a monohydric alcohol such as methyl alcohol, ethyl alcohol, propyl alcohol, or butyl alcohol. Such product can be epoxidized so as to have approximately one oxirane ring per acyl radical and avoids the presence of a non-epoxidized reactant as sometimes happens in the case of the glyceride.

As is well known the amides and the amines of fatty acids can be subjected to epoxidation and the resultant product employed as a fatty acid equivalent within the scope of the present invention. For instance, the fatty acid amides, particularly amides of 9,10-epoxystearic acid, are described in U.S. Patent No. 2,567,237, dated September 11, 1941, to Scanlan, et al. We have prepared similar amides from diamines in which there were 2 fatty acid groups and 2 amino groups.

The vegetable oils which when epoxidized may be used in practicing the present invention are those glycerides of saturated and unsaturated acids which have a degree of unsaturation represented by an iodine value of from 90 to 205 and in which the fatty acids neither are hydroxylated nor possess conjugated unsaturation. The semi-drying vegetable oils, which are primarily glycerides of oleic and linoleic acids, are preferred. Among those oils which may be used are epoxidized peanut, rapeseed, cottonseed, corn, tobacco seed, cucurbit, sunflower, safflower, poppyseed, linseed, perilla, and soybean oils. Of these epoxidized oils, soybean oil is particularly efficient. Theoretically, each carbon to carbon double bond of the original vegetable oil can be converted to an epoxy group. In practical operation this will seldom, if ever, be attained but it is desirable that highly epoxidized oils be used so that maximum stability be effected. It is recommended that there be used epoxidized oils containing an average of from 2 to 6 epoxy groups per molecule.

If the fatty acid group has some other functional group present, difficulty may be involved in obtaining optimum yields for some reason that is not entirely clear. This would apply, for example, to castor oil, and ricinoleic acid esters. On the other hand, if castor oil is reacted with a low molal acid such as acetic acid, propionic acid, or the like, then these difficulties appear to be eliminated. There also appears to be difficulty in obtaining suitable yields in the case of conjugated unsaturation. In some instances where the unsaturation is not conjugated there is indication that there may be a shift during reaction to produce conjugation. In other words, in the epoxidation of the fatty acid or fatty acid ester or the like, if the fatty acid is polyethylenic it is very important that the ethylenic radicals be non-conjugated. The fatty acids themselves may contain 8 to 22 carbon atoms. The best example of the monoethylenic acid is, of course, oleic acid and perhaps erucic acid. Both are readily available as glycerides. As to the polyethylenic acids, particular attention is directed to linoleic. As to an example of an acid having 3 ethylenic linkages attention is directed to linolenic. These acids, of course, are available in the form of glycerides, particularly mixed glycerides. Other polyethylenic acids are obtained from oils of aquatic origin.

PART 2

The polyamines which may be employed as reactants fall within two types. The first type is characterized by the fact that the polyamines have at least one primary amino radical separated from another primary or secondary amino radical by two to three carbon atoms in a single chain. These polyamines under certain conditions can form cyclic amidines.

One may use polyamines corresponding to the formula $$\begin{array}{c}H\\ \diagdown\\ N-R'-(NR')_x-N\\ \diagup\\ H\end{array}\begin{array}{c}R''\\ \\ \\ \\ R''\end{array}\quad X=0\text{ to }8$$

in which R'' is hydrogen, alkyl, cycloalkyl, aryl, or aralkyl and R' is a divalent radical such as —CH$_2$CH$_2$—, —CH$_2$CH$_2$CH$_2$—,

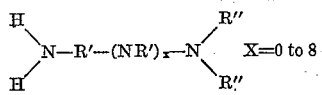

Stated another way, the polyamines have at least one primary amino group separated from another primary or secondary amino group by 2 to 4 carbon atoms. Examples of suitable amines include:

Ethylenediamine
Diethylenetriamine
Triethylenetetramine
Tetraethylenepentamine
Propylenediamine
Dipropylenetriamine
Tripropylenetetramine
Butylenediamine
Aminoethylpropylenediamine
Aminoethylbutylenediamine

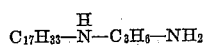

Other polyamines in which the nitrogen atoms are separated by a carbon atom chain having 4 or more carbon atoms include the following: Tetramethylenediamine, pentamethylenediamine, and especially hexamethylenediamine. The latter is of particular interest because the product is commercially available in light of its use in the manufacture of synthetic fibre.

If desired, one can prepare a variety of reactants having two or more amino groups and at least one hydroxyl group. One may use modifications of procedures or the procedures themselves as described in U.S. Patents Nos. 2,046,720 dated July 7, 1936, to Bottoms; 2,048,990 dated July 28, 1936, to Britton et al.; 2,447,821 dated August 24, 1948, to Sankus; and 1,985,885 dated January 1, 1935, to Bottoms. Examples include the following:

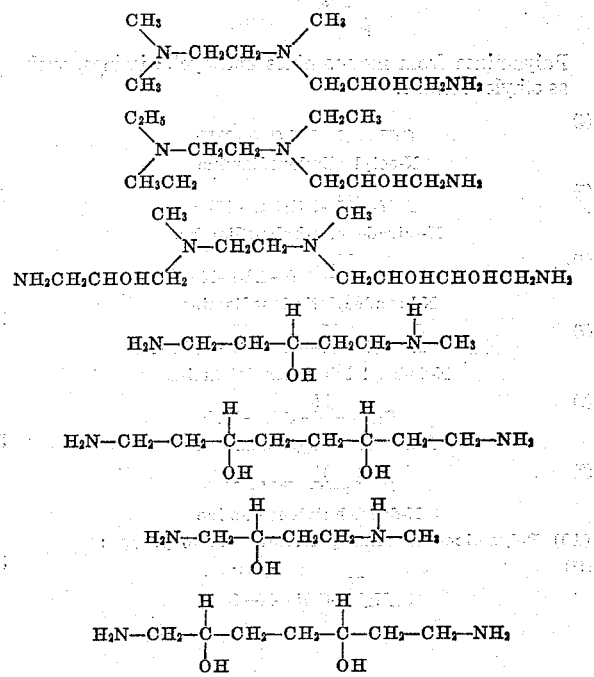

Other suitable amines are exemplified by ethylenebisoxypropylamine.

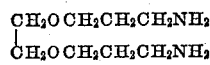

and derivatives obtained by treating ethylenebisoxypropylamine with 1, 2, 3 or 4 moles of ethylene oxide, propylene oxide, butylene oxide, or the like.

Other compounds including those having cyclic structures include piperazine, and the corresponding derivatives obtained by treating piperazine with alkylene oxides. The same applies to substituted piperazine such as the 2,5-dimethylpiperazine.

As to mono-substituted dialkanol piperazine see U.S. Patent No. 2,421,707, dated June 3, 1947, to Malkemus.

Another example of polyamine which may be employed as a reactant is that described as "Duomeens."

TABLE I

Duomeen is a trademark designation for certain diamines made by Armour Chemical Division, Armour & Company, Chicago, Illinois. The Duomeens have the following general formula:

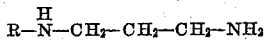

R is an alkyl group derived from a fatty acid or from the mixed fatty acids as obtained from certain oils. The specific Duomeen and the source of the radical R are as follows:

(1) Duomeen 12     R=lauric
(2) Duomeen C      R=Coconut oil fatty acid
(3) Similarly, a comparable diamine, presumably obtained from Rosin Amine D and acrylonitrile, is obtainable from Hercules Powder Company, Wilmington, Delaware. The composition of Rosin Amine D is as follows:

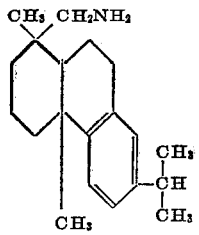

Polyamines from monoamines and cyclic imines, such as ethylene imine.

(4)
$$C_8H_{17}-\overset{H}{N}-CH_2CH_2-NH_2$$
N-octyl ethylenediamine (5)
$$C_{14}H_{29}-\overset{H}{N}-CH_2CH_2-NH_2$$
N-tetradecyl ethylenediamine (6)
$$C_{16}H_{33}-\overset{H}{N}-CH_2-CH_2-NH_2$$
N-hexadecylethylenediamine (7)
$$C_{12}H_{25}-\overset{H}{N}-C_2H_4-\overset{H}{N}-C_2H_4-\overset{H}{N}-C_2H_4-NH_2$$
N-dodecyl triethylenetetramine (8)
$$C_{12}H_{25}-\overset{H}{N}-C_3H_6-NH_2$$
N-dodecyl propylenediamine (9)
$$C_{10}H_{21}-\overset{H}{N}-C_4H_8-NH_2$$
N-decyl butylenediamine

(10) Polyamines containing tertiary amino groups:

(11)
$$C_{12}H_{25}N-C_3H_6-\overset{C_2H_5}{\underset{|}{N}}-C_2H_5$$

It is to be noted that all the above examples show high molal groups, i.e., 8 carbon atoms or more. The same derivatives in which methyl, ethyl, propyl, butyl, amyl, hexyl groups, or the like, appear instead of octyl, decyl, etc., are equally satisfactory.

PART 3

Section 1

The present section is concerned with the reaction between the polyamines and epoxidized monohydric alcohol esters.

For purpose of brevity we are going to limit the examples to esters which are available commercially or can be obtained from suppliers of epoxidized products. These esters are epoxybutyl stearate, isobutylepoxyacetoxy stearate, and methylepoxy soyate.

As previously pointed out the reaction involving the reactant containing the oxirane ring and polyamine is essentially a variety of oxyalkylation. For this reason the reactions are so conducted. The procedure is simpler than is the case when ethylene oxide or propylene oxide is used for the reason that the reactants are non-volatile as a rule and thus one does not have to use an autoclave or similar equipment. Furthermore, many of the reactants employed are basic in character and thus to the extent required act as their own catalyst. As has been pointed out elsewhere catalysts can be added, particularly alkaline catalysts such as sodium methylate, caustic soda, caustic potash, etc. In a general way, the procedure employed in preparing the products is the same and the only precaution taken as a rule is to avoid temperatures above that required to rupture the oxirane ring for the reason that side reactions or secondary reactions may take place.

TABLE 1

| Ex. No. | Oxirane Ring Containing Reactant | Amt., gms. | Oxyalkylation Susceptible Reactant | Amt., gms. | Temp., °C. | Time, Hrs. | Product of Reaction |
|---|---|---|---|---|---|---|---|
| 1a | Epoxybutyl stearate. | 184 | Aminoethyl Stearamide | 155 | 110 150 | 3 0.5 | Dk. brn. visc. liq. sol. in alcohol and xylene. |
| 2a | do | 150 | Hydrazine | 13.7 | 110 | 3 | White creamy emul. with 5% H₂O in hydrazine. Sol. in hot xylene and isopropanol. Crystalline in cold xyl. and isopropanol. |
| 3a | do | 175 | Ethylene diamine | 35 | 110 | 3 | Brn. liq. sol. in xylene and isoprop. |
| 4a | do | 175 | Diethylene triamine | 49 | 110 | 3 | Brn. liq., sol. in xyl. and isopropanol. |
| 5a | do | 150 | Triethylene tetramine. | 59.5 | 110 | 3 | Brn. liq., sol. in xyl. and isopropanol. |
| 6a | do | 175 | Tetraethylene pentamine. | 90 | 110 | 3 | Brn. liq. sol. in xyl. isopropanol and water. |
| 7a | do | 150 | Propylene diamine. | 30.2 | 110 | 3 | Brn. liq. sol. in xyl. isopropanol and water. |
| 8a | do | 150 | Propylene triamine. | 36.2 | 110 | 3 | Brn. liq. sol. in xyl. and isopropanol. |
| 9a | do | 150 | Duomeen S. | 164.0 | 130 | 3 | Lt. brn. semisolid sol. in xyl. and isopropanol. |
| 10a | do | 150 | Hydroxyethyl ethylene diamine. | 42.8 | 115 | 3 | Lt. brn. liq., sol. in xyl. and isopropanol. |

Duomeen S is an amino propyl alkylamine, $$RNHC_3H_6NH_2$$

derived from soyafatty acid. It is a product of Armour Chemical Company.

TABLE 2

| Ex. No. | Oxirane Ring Containing Reactant | Amt., gms. | Oxyalkylation Susceptible Reactant | Amt., gms. | Temp., °C. | Time, Hrs. | Product of Reaction |
|---|---|---|---|---|---|---|---|
| 11a | Isobutyl-epoxy-acetoxy stearate. | 241 | 1,6 hexane-diamine. | 30.3 | 115 | 4 | Dk. brn. liq. sol. in xyl. and alcohol. |
| 12a | ---do--- | 241 | ---do--- | 60.5 | 115 | 3 | Brn. liq. sol. in xyl. and alcohol. |
| 13a | ---do--- | 241 | m-phenylene diamine. | 44.0 | 120 / 160 | 2 / 2 | Black visc. liq. sol. in xyl. and alcohol. |
| 14a | Methyl* Epoxy-soyate. | 150 | Ethylene diamine (78%). | 38 | 120 / 150 | 2 / 0.5 | Brn. vis. liq. sol. in xylene and isopropanol. |
| 15a | ---do--- | 150 | Propylene diamine. | 37 | 120 / 150 | 1.5 / 0.5 | Drk. brn. vis. liq. sol. in xyl. and alcohol. |
| 16a | ---do--- | 150 | M-phenylene diamine. | 54 | 120 / 165 | 2 / 2 | Drk. brn. very vis. liq. sol. in xyl. and alcohol. |
| 17a | ---do--- | 160 | Hydrazine (95%). | 17 | 110 | 3 | White creamy liq. sol. in hot xyl. and iso-propanol. |
| 18a | ---do--- | 150 | Hydroxyethyl ethylene diamine. | 53 | 105 / 130 | 3 / 0.5 | Yel. vis. liq. xyl. and isopropanol soluble. |
| 19a | ---do--- | 300 | Propylene diamine. | 37 | 120 / 150 | 2 / 0.5 | Brown vis. liq. sol. in xylene and alcohol. |
| 20a | ---do--- | 300 | Ethylene diamine (78%). | 38 | 120 / 150 | 3 / 0.5 | Brown, very visc. liq. sol. in xylene and alcohol. |

*Methyl Expoxysoyate—Expoxidized methyl ester of soybean fatty acid.

PART 3

Section 2

The present section is devoted to derivatives obtained by means of epoxidized glycerides, such as epoxidized soybean oil.

TABLE 3

| Ex. No. | Oxirane Ring Containing Reactant | Amt., gms. | Oxyalkylation Susceptible Reactant | Amt., gms. | Temp., °C. | Time, Hrs. | Product of Reaction |
|---|---|---|---|---|---|---|---|
| 1b | Expoxidized soybean oil. | 150 | Diethylene triamine. | 57 | 105 / 130 | 3 / 0.5 | Amber viscous liq. sol. in xylene and isopropanol. |
| 2b | ---do--- | 125 | Amine 333. | 67.6 | 105 / 130 | 3 / 0.5 | Orange viscous liq. sol. in xylene and isopropanol. |
| 3b | ---do--- | 150 | Hydroxyethyl ethylene diamine. | 55.4 | 105 / 130 | 3 / 0.5 | Yel. visc. liq. sol. in xylene and isopropanol. |
| 4b | ---do--- | 150 | Diamino-propane. | 37 | 105 / 130 | 3 / 0.5 | Light brown visc. liq. sol. in xylene and isopropanol. |
| 5b | ---do--- | 150 | 3,3 Imino bispropylamine. | 65.5 | 105 / 150 | 3 / 0.5 | Dark red visc. liq. sol. in xylene and alcohol. |
| 6b | ---do--- | 150 | Betahydroxyethyl hydrazine. | 38 | 105 / 130 | 3 / 0.5 | White waxy solid sol. in hot xylene and hot isopropanol. |
| 7b | ---do--- | 150 | N,N-diethyl ethylene diamine. | 58 | 115 / 150 | 3 / 0.5 | Dark amber visc. liq. xylene and alcohol soluble. |

TABLE 4

| Ex. No. | Oxirane Ring Containing Reactant | Amt., gms. | Oxyalkylation-Susceptible Reactant | Amt., gms. | Temp., °C. | Time, Hrs. | Product of Reaction |
|---|---|---|---|---|---|---|---|
| 8b | Epoxidized triacetylated castor oil. | 162 | Propylene triamine. | 26.7 | 110 | 3 | Drk. brn. semi-solid, sol. in xyl. and iso-propanol. |
| 9b | ___do___ | 162 | m-phenylene diamine. | 32.4 | 120<br>160 | 2<br>2 | Blk. vis. semi-solid, sol. in xyl. and alc. |
| 10b | ___do___ | 189 | Hydrazine | 12 | 110 | 3 | White creamy semi-solid, sol. in hot xyl. and hot isopropanol. |
| 11b | ___do___ | 135 | Duomeen S | 100 | 130 | 3 | Lt. brn. semi-solid, sol. in xyl. and iso-prop. |
| 12b | ___do___ | 162 | N-phenyl-2-methyl-1,2-propane diamine. | 49 | 130 | 3 | Brn. visc. liq. sol. in xyl. and alcohol. |

Amine 333 is a product of Mathieson Chemical Corporation. It is composed of diethylene triamine, triethylene tetramine and tetraethylene pentamine in equal weight proportions.

PART 3

Section 3

As has been pointed out previously, one can obtain sodium epoxystearate and potassium epoxystearate and some other comparable sodium salts. For reasons of economy our preference is to start with other epoxidized fatty derivatives and obtain the salts by saponification. However, the salts can be used as, for example, sodium epoxystearate or potassium epoxystearate, as illustrated by the subsequent Examples 1c through 10c.

Example 1c

A 500 ml. 3-necked flash was fitted with a reflux condenser, a thermometer and an efficient sealed stirrer. In the flask were placed 25.8 grams of diethylene triamine and 250 grams of methanol. When the triamine and methanol had been completely mixed, 88.8 grams of powdered sodium epoxystearate were added and vigorous stirring was applied. The mixture remained a white suspension while its temperature rose spontaneously from 25° to 29° C. As soon as the temperature ceased to rise, heat was applied gradually to bring the mixture to a gentle reflux at 70° C. The suspension became homogeneous at the reflux temperature. After the heating had been continued for 3 hours, the reaction was complete and the product was poured into a 800 cc. beaker to cool into a white solid gel. The solid gel was insoluble in the methanol solvent. It was ground with a stirring rod, filtered by suction, washed with isopropanol and dried under vacuum. The dried product was a white solid powder, soluble in water and hot methanol, insoluble in xylene, isopropanol and dioxane.

TABLE 5

| Ex. No. | Oxirane ring-containing Reactant | Amt., gms. | Polyamino Reactant | Amt., gms. | Solvent Methanol, gms. | Temp., °C. | Time, hrs. | Product of Reaction |
|---|---|---|---|---|---|---|---|---|
| 1c | Sodium epoxy stearate. | 88.8 | Diethylene triamine. | 25.8 | 250 | 71 | 3 | White solid, sol. in wtr. and hot methanol, insol. in benzene and cold alc. |
| 2c | ___do___ | 88.8 | Tetraethylene pentamine | 47.2 | 250 | 70 | 3 | Yel. white solid. Sol. in wtr. and hot methanol; insol. in bezene and cold meth. |
| 3c | ___do___ | 88.8 | Tetraethylene pentamine. | 23.6 | 250 | 71 | 4 | White soft solid. Sol. in wtr. sltly. sol. in benzene. Sol in hot methanol. |
| 4c | ___do___ | 88.8 | Duomeen S | 82 | 250 | 71 | 3 | Yel. waxy solid. sol. in isopropanol, sltly. sol. in xyl. and water. |
| 5c | ___do___ | 88.8 | N'-phenyl,2-methyl 1,2-propanediamine. | 41 | 250 | 69 | 4 | Yel. solid, sol. in wtr. and hot methanol Sltly. sol. in benzene. |
| 6c | Potassium epoxy stearate. | 92.8 | N,N-diethyl ethylene diamine | 29 | 250 | 68 | 4 | Pale white solid, sol. in wtr. and hot methanol, insol. in benz. |
| 7c | ___do___ | 92.8 | Ethylene diamine 85% | 17.7 | 250 | 70 | 3 | White solid. Sol. in wtr. and hot methanol, insol. in benzene. |
| 8c | ___do___ | 92.8 | 3,3-iminobis-propylamine. | 32.8 | 250 | 70 | 3 | Yel. solid sol. in wtr. and hot methanol, insol. in benzene and cold methanol. |
| 9c | ___do___ | 92.8 | 3,3-iminobis-propylamine. | 16.4 | 250 | 71 | 3 | Yel. white soft solid sol. in isopropanol, sltly. sol. in benzene and water. |
| 10c | ___do___ | 92.8 | Hydrazine monohydrate. | 12.5 | 250 | 69 | 3 | White solid sol. in wtr. and hot methanol, insol. in benzene and isopropanol. |

PART 4

As has been previously suggested, having obtained a derivative of an epoxidized ester, for instance, an epoxidized glyceride or ester of a monohydric alcohol, the preparation of a sodium salt or the equivalent salt, such as the potassium salt or the lithium salt or the like, merely depends on a comparatively simple saponification reaction which is conducted in the conventional manner, usually in the presence of a solvent, and at a temperature of about 100° C. for two or three hours or thereabouts. Such procedure is illustrated by Examples 1d through 24d, which appear in Table 6, following.

Example 1d 150 grams of epoxybutyl stearate and 13.7 grams of hydrazine were reacted at 110° C. for 3 hours (Example 2a). To 141 grams of this reaction product, 117 grams of 12% sodium hydroxide were added. This heterogeneous mixture was reacted at 98° C. under slight reflux until a clear homogeneous solution was formed. Then it was heated for another hour to insure complete reaction. The total time of reaction was 2 hours. The product, 50% in concentration, was a clear yellow gel. The dried product was a yellowish white powder, soluble in hot methanol, insoluble in xylene, petroleum ether and dioxane. Its water solution is surface active.

any other conventional procedure. This is illustrated by Examples 1e through 12e in Table 7, following.

Example 1e

In a one-liter beaker, 91.5 grams of the reaction product obtained from Example 1c were dissolved in 200 grams of water. Into this solution, 222 grams of 10% calcium chloride solution were added with vigorous stirring. As soon as the chloride was added, a white dense precipitate was formed. The mixture was first stirred at room temperature, 20–30° C., for 2 hours, then it was warmed at 50° C. for an hour to allow the precipitate to settle. After settling, the precipitate was washed by decantation, filtered in a fluted filter and dried under vacuum. The dried product was a white solid, soluble in hot benzene and a benzene, isopropanol mixture, insoluble in water.

PART 6

The products herein described fall into two classes, one in which the salts are water soluble, for instance the sodium salts, potassium salts, lithium salts, or the like, and the other where the salts are water insoluble, such as the calcium salt, magnesium salt, barium, aluminum, zinc, and iron salts. The water soluble salts may be used for the resolution of petroleum emulsions of the water-

TABLE 6

| Ex. No. | Compd. Used | Amt., gms. | Alkali Used | Amt., gms. | Solvent Water, gms. | Temp., ° C. | Time, hrs. | Product of Reaction |
|---|---|---|---|---|---|---|---|---|
| 1d | 2a | 141 | Sodium Hydroxide. | 14 | 103 | 98 | 2 | 50% soln. yellow colored gel. Also sol. in hot methanol. Insol. in xylene or petroleum ether. |
| 2d | 4a | 165 | ----do---- | 14 | 127 | 98 | 2 | Do. |
| 3d | 6a | 195 | ----do---- | 14 | 157 | 98 | 2 | Do. |
| 4d | 8a | 160 | ----do---- | 14 | 122 | 98 | 2 | Do. |
| 5d | 10a | 166 | ----do---- | 14 | 128 | 98 | 2 | Do. |
| 6d | 12a | 248 | ----do---- | 14 | 210 | 98 | 2 | Do. |
| 7d | 13a | 245 | ----do---- | 14 | 207 | 98 | 2 | Do. |
| 8d | 14a | 169 | ----do---- | 18 | 158 | 98 | 2 | Do. |
| 9d | 15a | 168 | ----do---- | 18 | 157 | 98 | 2 | Do. |
| 10d | 18a | 182 | ----do---- | 18 | 171 | 98 | 2 | Do. |
| 11d | 19a | 135 | Potassium Hydroxide. | 22.4 | 131 | 98 | 2 | Do. |
| 12d | 19a | 135 | ----do---- | 11.2 | 133 | 98 | 2 | Do. |
| 13d | 20a | 135 | ----do---- | 22.4 | 128 | 98 | 2 | Do. |
| 14d | 20a | 135 | ----do---- | 11.2 | 130 | 98 | 2 | Do. |
| 15d | 1b | 120 | Sodium hydroxide. | 11.6 | 114 | 98 | 2.5 | 50% soln. yellow colored gel. Dried product is yellowish to white solid, sol. in hot methanol, insol. in benzene or petroleum ether. |
| 16d | 2b | 120 | ----do---- | 10.6 | 114 | 98 | 2.5 | Do. |
| 17d | 3b | 120 | ----do---- | 16.6 | 120 | 98 | 2.5 | Do. |
| 18d | 4b | 120 | ----do---- | 12 | 115 | 98 | 2.5 | Do. |
| 19d | 5b | 120 | ----do---- | 11.1 | 114 | 98 | 2.5 | Do. |
| 20d | 6b | 120 | Potassium hydroxide. | 17.8 | 120 | 98 | 2.5 | Do. |
| 21d | 7b | 120 | ----do---- | 16.7 | 120 | 98 | 2.5 | Do. |
| 22d | 8b | 100 | ----do---- | 8.9 | 104 | 98 | 2.5 | Do. |
| 23d | 10b | 100 | ----do---- | 9.75 | 104 | 98 | 2.5 | Do. |
| 24d | 12b | 100 | ----do---- | 8 | 104 | 98 | 2.5 | Do. |

PART 5

Having obtained a suitable water soluble salt, particularly a sodium or potassium salt of the kind illustrated by Examples 1d through 24d in Table 6, preceding, obviously all that is required to convert such a salt into the calcium, magnesium or other comparable water insoluble salt, is to follow the same procedure employed for the preparation of zinc oleate, copper naphthenate, magnesium stearate, etc.

Briefly stated, this simply means reacting the two appropriate reactants in stoichiometric ratios, washing so as to remove the water soluble salts formed as, for example, sodium chloride, potassium chloride or the like, and subjecting the washed precipitate to drying, if required, or in-oil type. The water insoluble salts in many instances are particularly valuable as additives for lubricating oils which are derived from sources other than petroleum.

The products herein described, whether water soluble or not, just so long as they are reasonably soluble in petroleum and petroleum products at considerable dilutions, are valuable as fuel oil additives in the manner described in U.S. Patent 2,553,183, dated May 15, 1951, to Caron et al. They can be used in substantially the same proportions or lower proportions and this is particularly true when used in conjunction with a glyoxalidine or amido glyoxalidine.

An analogous use in which these products are equally satisfactory, is that described in U.S. Patent No. 2,665,-

TABLE 7

| Ex. No. | Compd. Used | Amt., gms. | Salt used | Amt., gms. | Water, gms. | Temp., °C. | Time, hrs. | Product of Reaction |
|---|---|---|---|---|---|---|---|---|
| 1e | 1c | 91.5 | Calcium chloride | 22.2 | 400 | 20-30 50 | 2 0.5 | White solid, sol. in hot benzene and benzene-isopropanol mix, insol. in water. |
| 2e | 5c | 104 | ----do---- | 22.2 | 400 | 20-30 50 | 2 0.5 | Do. |
| 3e | 10c | 80.7 | ----do---- | 22.2 | 400 | 20-30 50 | 2 0.5 | Do. |
| 4e | 1d—50% | 147.5 | ----do---- | 22.2 | 400 | 20-30 50 | 2 0.5 | Do. |
| 5e | 4d—50% | 169.2 | Barium chloride. | 41.6 | 400 | 20-30 50 | 2 0.5 | Yel. white solid, sltly. sol. in xyl. and isopropanol. Sol. in hot alcohol or xylene isopropanol mix. insol. in water. |
| 6e | 8d—50% | 153 | ----do---- | 41.6 | 400 | 20-30 50 | 2 0.5 | Yel. soft solid sltly. sol. in xyl. Sol. in xyl. isopropanol mix. |
| 7e | 11d—50% | 144.5 | Aluminum chloride. | 26.7 | 400 | 20-30 50 | 2 0.5 | Pale yel. solid. Sltly. sol. in xyl. Sol. in hot xyl. or xyl. and isopropanol mix. |
| 8e | 12d—50% | 139.6 | ----do---- | 13.3 | 400 | 20-30 50 | 2 0.5 | Yel. white soft solid fairly sol. in xyl. and isopropanol. Insol. in water. |
| 9e | 14d—50% | 137 | Magnesium sulfate. | 13 | 400 | 20-30 50 | 2 0.5 | White soft solid. fairly sol. in xyl. and isopropanol. |
| 10e | 16d—50% | 185 | ----do---- | 24 | 400 | 20-30 50 | 2 0.5 | White solid. Sol. in benzene, sltly. sol. in isopropanol. Insol. in petroleum ether. |
| 11e | 18d—50% | 164 | Cupric sulfate. | 32 | 400 | 100 | 3 | Green visc. liq. Cools into soft solid. Fairly sol. in benzene. Sltly. sol. in isopropanol. |
| 12e | 20d—50% | 162 | Zinc chloride. | 27.3 | 400 | 20-30 50 | 2 0.5 | White solid. Fairly sol. in benzene, insol. in isopropanol. |

978, dated January 12, 1954, to Stayner et al. The amount employed is in the same proportion or lesser amounts than referred to in said aforementioned Caron et al. patent.

The second use is for the purpose of inhibiting fogs in hydrocarbon products as described in U.S. Patents Nos. 2,550,981 and 2,550,982, both dated May 1, 1951, and both to Eberz. Here again it can be used in the same proportions as herein indicated or even smaller proportions.

A third use is to replace oil soluble petroleum sulfonates, so-called mahogany soaps, in the preparation of certain emulsions, or soluble oils or emulsifiable lubricants where such mahogany soaps are employed. The products serve to replace all or a substantial part of the mahogany soap.

Another use is where the product does not serve as an emulsifying agent alone but serves as an adjunct.

Briefly stated, the fourth use is concerned with use as a coupling agent to be employed with an emulsifying agent. See "The Composition and Structure of Technical Emulsions," J. H. Goodey, Roy. Australian Chem. Inst. J. and Proc., vol. 16, 1949, pp. 47–75. As stated in the summary of this article "The technical oil-in-water emulsion is regarded as a system of four components: the dispersion medium, consisting of the highly polar substance water; the disperse phase composed of hydrocarbons or other substances of comparatively weak polarity; the coupling agent, being an oil-soluble substance involving an hydroxyl, carboxyl or similar polar group; and the emulsifying agent, which is a water-soluble substance involving an hydrocarbon radical attached to an ionizable group."

Fifth, these materials have particular utility in increasing the yield of an oil well by various procedures which in essence involve fracturing of the strata by means of liquid pressure. A mixture of these products with oil or oil in combination with a gel former alone or a gel former and finely divided mineral particles, yields a product which, when it reaches crevices in the strata which are yielding water, forms a gelatinous mass of curdy precipitate or solid or semi-solid emulsion of a high viscosity. In any event, it represents a rapid sealing agent for the strata crevices and permits pressure to be applied to fracture the strata without loss of fluid through crevices, openings or the like.

Such compounds or derivatives also are effective for other purposes, such as an anti-fogging agent in motor fuels, a coagulation preventive in burner oils, and as an additive for the prevention of corrosion of ferrous metals. Such invention, however, is not part of what is herein claimed.

The herein described products and the derivatives thereof are particularly valuable in flooding processes for recovery of oil from subterranean oil-bearing strata when employed in the manner described in U.S. Patent No. 2,233,381, dated February 25, 1941, to De Groote and Keiser.

Furthermore, the herein described products may be employed to increase operating efficiency by increasing the oil-to-brine ratio or by increasing the total oil recovery in primary recovery operations as differentiated from secondary recovery operations. The procedures employed are essentially those as described in either U.S. Patent No. 2,331,594, dated October 12, 1943, to Blair, or U.S. Patent No. 2,465,237 dated March 22, 1949, to Larsen.

When the products of the kind herein described are used for water flooding and particularly in the form of salts, they have unusual value in a fresh water or brine system for the inhibition of the growth of both anaerobic and aerobic bacteria but are particularly applicable in controlling the sulfate reducing organisms which cause difficulty in secondary recovery operations. Thus, one may use some other agent or agents in water flood systems and use compounds as herein described primarily for reducing bacterial growth. The use of such industrial bactericide is well known and the procedure is conventional; for instance, one can use the methods described in an article entitled "The Role of Microorganisms" by R. C. Allred, which appeared in Producers Monthly, vol. 18, No. 4, pages 18–22.

The products herein described are particularly valuable as industrial bactericides and this applies to both the water soluble salts and particularly those which are water soluble even when converted into the copper salt. The copper salts, even if water insoluble, when mixed with suitable dispersing agents, for instance, the analogous sodium salts, are unusually effective as bactericides.

Previous reference was made to the fact that the herein described products, even after the carboxyl group has been converted at least in part, or entirely, into a salt form, still may have basic amino groups present which in turn may combine with acids such as glycolic acid, oleic acid, naphthenic acid, gluconic acid, petroleum sulfonic acid of either the green acid type or the mahogany acid type, or the like and considerably change the solubility in either water or oil or other vehicles and thus make these forms suitable for practically any or all purposes previously mentioned and this applies particularly to the use of additives in fuel oils or the like. Indeed, such combinations are particularly useful in the resolution of petroleum emulsions of the water-in-oil type.

It is understood in the hereto appended claims that reference to the compounds includes such variants obtained by neutralization of residual basic amino groups with one or more of the acids previously noted, i.e., either acids are introduced and give predominantly hydrophobe effect or a predominantly hydrophile effect.

As is obvious, if epoxidized compounds of the kind herein described, for instance, epoxidized soybean oil or, more conveniently, epoxidized butylsoyate, are reacted with a polyamine such as ethylene diamine, diethylene triamine, triethylene tetramine, tetraethylene pentamine, the derivatives so obtained can be saponified and acidified under appropriate conditions so it is possible to obtain an inner or an intra salt involving a basic amino radical and a residual carboxyl radical.

However, if such product, or a suitable intermediate, or the initial product itself, is saponified with a strong base, such as caustic soda or caustic potash, or the like, the resultant product is characterized by the presence of a metallic ion, for instance, sodium or potassium, in the carboxyl portion and the amino group is merely part of the acyl radical. Both types of products can be obtained by conventional means from the herein described resultants, i.e., either the so-called free acid which in essence really is an inner salt or an intra salt, or the salt formed by the use of sodium hydroxide, potassium hydroxide, or the like. The products so obtained whether metallic salts or inner salts or intro salts are effective for the prevention of corrosion, not only in an aerobic system but also in an anaerobic system.

Having thus described our invention what we claim as new and desire to obtain by Letters Patent, is:

1. A member selected from the class of salts and acid salts of the structure

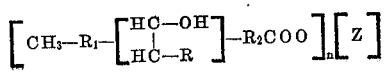

and

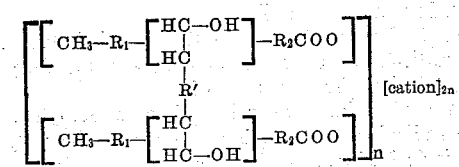

said salts and acid salts being derived from saponifiable polyamine reacted acyl radical containing epoxidized compounds wherein the fatty acid radical prior to epoxidation is

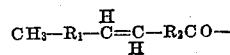

in which $R_1$ and $R_2$ are the conventional hydrocarbon radicals of unsaturated fatty acids composed only of carbon, hydrogen and oxygen atoms having not over 22 carbon atoms and each containing at least 3 carbon atoms; in which R is the radical of a polyamine composed only of carbon, hydrogen, nitrogen, and oxygen atoms, having up to 20 carbon atoms, and having at least one basic nitrogen atom, said radical being formed by the removal of a hydrogen atom from an amino nitrogen atom of the polyamine during rupture of the oxirane ring and linkage of the amino nitrogen atoms with a carbon atom of the oxirane ring, and R' is the radical of a polyamine composed only of carbon, hydrogen, nitrogen and oxygen atoms, having not over 20 carbon atoms and having at least one basic nitrogen atom, said radical being formed by the removal of one hydrogen atom from each of two separate amino nitrogen atoms of the polyamine during rupture of the oxirane rings and linkage of the amino nitrogen atoms with the carbon atoms of the oxirane rings; and $n$ is a whole number not over 3; and in which Z is selected from the group consisting of group I$a$, I$b$, II$a$, II$b$ and III$a$ metal ions, and the cation is selected from the group consisting of Z, hydrogen, and lower alkanol radicals and must include at least one equivalent of Z per anion.

2. A member selected from the class of salts of the structure

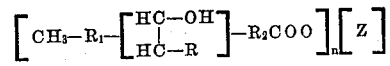

said salts being derived from saponifiable polyamine reacted acyl radical containing epoxidized compounds wherein the fatty acid acyl radical prior to epoxidation is

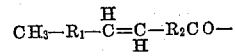

in which $R_1$ and $R_2$ are the conventional hydrocarbon radicals of unsaturated fatty acids composed only of carbon, hydrogen and oxygen atoms having not over 22 carbon atoms and each containing at least 3 carbon atoms; in which R is the radical of a polyamine composed only of carbon, hydrogen, nitrogen, and oxygen atoms, having up to 20 carbon atoms, and having at least one basic nitrogen atom, said radical being formed by the removal of a hydrogen atom from an amino nitrogen atom of the polyamine during rupture of the oxirane ring and linkage of the amino nitrogen atom with a carbon atom of the oxirane ring; in which $n$ is a whole number not over 3; and in which Z is selected from the group consisting of group I$a$, I$b$, II$a$, II$b$ and III$a$ metal ions.

3. Salts of claim 2 wherein the radical R is a polyalkylene polyamine radical having a plurality of basic nitrogen atoms.

4. Salts of claim 2 wherein R is an ethylene diamine radical, the cation is sodium, and the fatty acid radical is derived from soybean oil.

5. Salts of claim 2 wherein R is a diethylene triamine radical, the cation is sodium, and the fatty acid radical is derived from soybean oil.

6. Salts of claim 2 wherein R is a triethylene tetraamine radical, the cation is sodium, and the fatty acid radical is derived from soybean oil.

7. Salts of claim 2 wherein R is a tetraethylene pentamine radical, the cation is sodium, and the fatty acid radical is derived from soybean oil.

References Cited in the file of this patent

UNITED STATES PATENTS

| | | |
|---|---|---|
| 2,445,892 | Swern et al. | July 27, 1948 |
| 2,646,405 | Hughes | July 21, 1953 |
| 2,682,514 | Newey | June 29, 1954 |
| 2,712,535 | Fisch | July 5, 1955 |
| 2,761,870 | Payne et al. | Sept. 4, 1956 |